US00RE40379E

(19) United States
(12) Reissued Patent
Hastings

(10) Patent Number: US RE40,379 E
(45) Date of Reissued Patent: Jun. 17, 2008

(54) ITEM HOLDER CONNECTED TO LINE DISPENSER

(76) Inventor: Mark Hastings, 13145Madison Ave., Largo, FL (US) 33773

(21) Appl. No.: 29/288,312

(22) Filed: Jun. 6, 2007

Related U.S. Patent Documents

Reissue of:
(64) Patent No.: Des. 539,527
Issued: Apr. 3, 2007
Appl. No.: 29/224,306
Filed: Feb. 28, 2005

(51) LOC (8) Cl. ..... 03-01
(52) U.S. Cl. ..... D3/215
(58) Field of Classification Search ..... D3/215, D3/224, 207–212, 226, 228; 40/1.5, 1.6; 24/3.11, 3.12, 3.13, 3.6; D8/34; 431/253; D19/43–51; D27/161
See application file for complete search history.

(56) References Cited

U.S. PATENT DOCUMENTS

| | | | | |
|---|---|---|---|---|
| D471,005 | S | 3/2003 | Hastings | D3/215 |
| D480,757 | S | 10/2003 | Kennedy | D19/54 |
| D495,362 | S | 8/2004 | Qiu | D19/43 |
| D514,311 | S | 2/2006 | Cetera | D3/215 |
| D516,241 | S | 2/2006 | Gaines et al. | D3/215 |
| D539,528 | S | 4/2007 | Hastings | D3/215 |
| 2003/0113680 | A1 | 6/2003 | Genuise | 431/253 |

*Primary Examiner*—Catherine R. Oliver
(74) *Attorney, Agent, or Firm*—Thomas E. Toner; Smith & Hopen, P.A.

(57) CLAIM

The ornamental design for an item holder connected to a line dispenser, as substantially shown and described.

DESCRIPTION

FIG. 1 is a front perspective view of the novel item holder when connected in abutting relation to a line dispenser;
FIG. 2 is a front perspective view of the novel item holder when spaced apart from said line dispenser;
FIG. 3 is a rear perspective view of the novel item holder when connected in abutting relation to said line dispenser;
FIG. 4 is a rear perspective view of the novel item holder when spaced apart from said line dispenser;
FIG. 5 is a front perspective view of the novel item holder when connected in abutting relation to said line dispenser and when a lighter item is held in said holder;
FIG. 6 is a rear perspective view of the novel item holder when connected in abutting relation to said line dispenser and when said lighter item is held in said holder;
FIG. 7 is a side elevational view of the novel item holder when connected in abutting relation to said line dispenser; and,
FIG. 8 is a top plan view of the novel item holder when connected in abutting relation to said line dispenser.
The broken line showing of environment in the drawings is included for the purpose of illustration only and forms no part of the claimed design.

1 Claim, 3 Drawing Sheets

Figure 1:
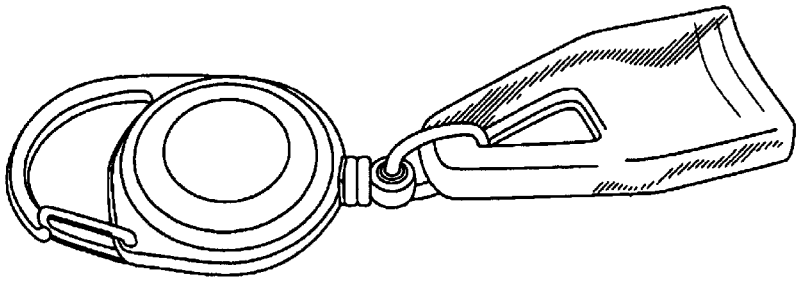
Figure 2:
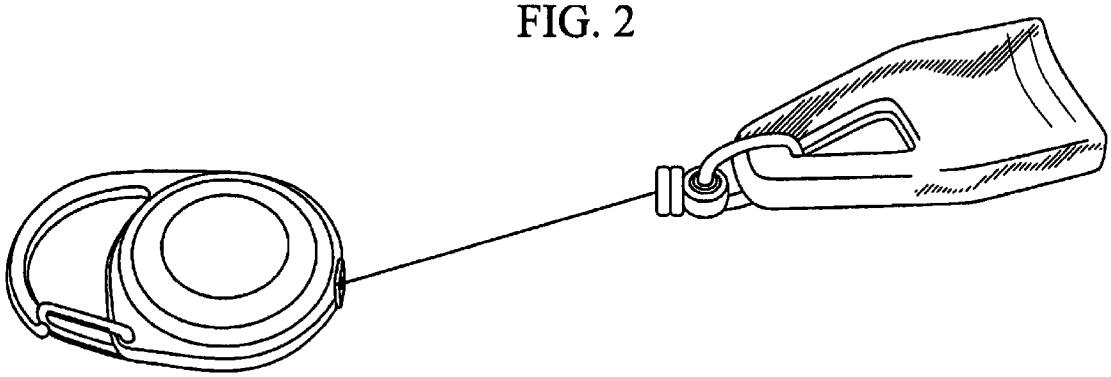
Figure 3:
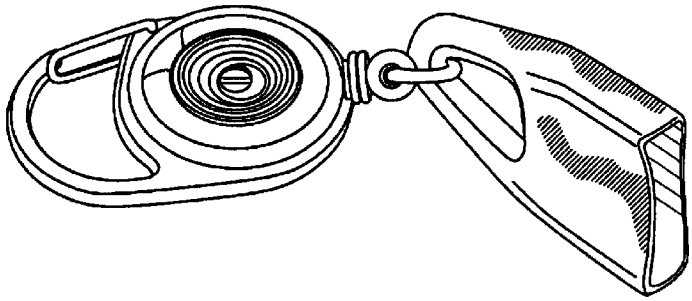
Figure 4:
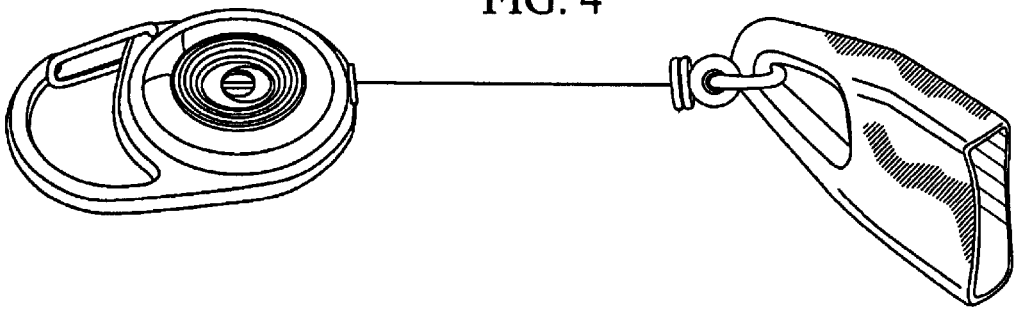
Figure 5:
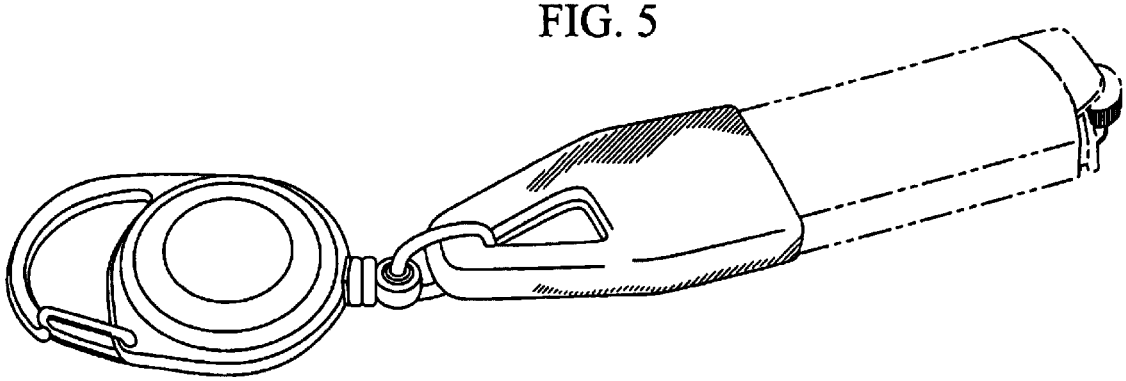
Figure 6:
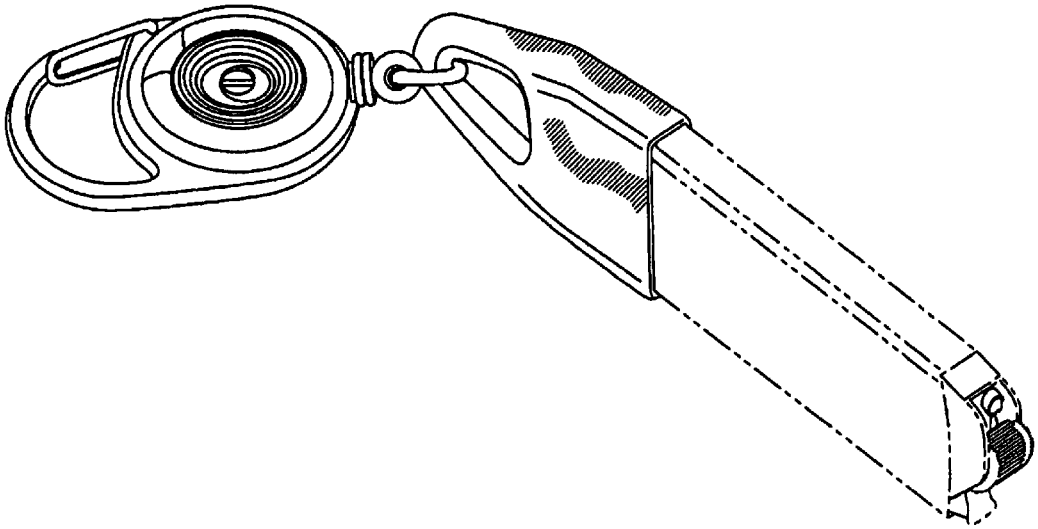
Figure 7:
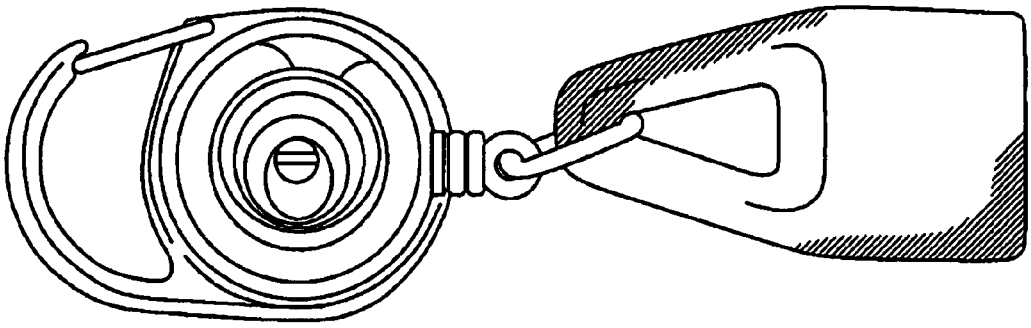
Figure 8:
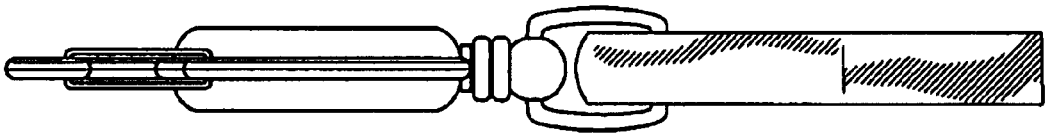

Matter enclosed in heavy brackets [ ] appears in the original patent, but forms no part of this reissue; matter printed in italics indicates the additions made by reissue.